(12) United States Patent
Nguyen et al.

(10) Patent No.: US 9,497,141 B2
(45) Date of Patent: Nov. 15, 2016

(54) SWITCH POINT HAVING LOOK-AHEAD BYPASS

(71) Applicant: FREESCALE SEMICONDUCTOR, INC., Austin, TX (US)

(72) Inventors: Thang Q. Nguyen, Austin, TX (US); Mark A. Banse, Austin, TX (US); Sanjay R. Deshpande, Austin, TX (US); John E. Larson, Round Rock, TX (US); Fernando A. Morales, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 163 days.

(21) Appl. No.: 14/624,207

(22) Filed: Feb. 17, 2015

(65) Prior Publication Data

US 2016/0241492 A1    Aug. 18, 2016

(51) Int. Cl.
| | |
|---|---|
| *H04L 12/28* | (2006.01) |
| *H04L 12/56* | (2006.01) |
| *H04L 12/933* | (2013.01) |
| *H04L 12/911* | (2013.01) |

(52) U.S. Cl.
CPC ......... *H04L 49/1546* (2013.01); *H04L 47/821* (2013.01)

(58) Field of Classification Search
CPC ............. H04L 47/821; H04L 49/1546; H04L 12/933; H04L 12/911
See application file for complete search history.

(56) References Cited

U.S. PATENT DOCUMENTS 7,809,007 B2    10/2010    Mayhew et al.

OTHER PUBLICATIONS

Daya et al, "Scorpio: A 36-Core Research Chip Demonstrating Snoopy Coherence on a Scalable Mesh NoC with In-Network Ordering", 41st International Symposium on Computer Architecture (ISCA), Jun. 14-18, 2014, pp. 25-36, IEEE, Minneapolis, MN.
Kumar et al, "A 4.6 Tbits/s 3.6 GHz Single-cycle NoC Router with a Novel Switch Allocator in 65nm CMOS", 25th International Conference on Computer Design, Oct. 7-10, 2007, pp. 63-70, IEEE, Lake Tahoe, CA.
Xin et al, "A Low-latency NoC Router with Lookahead Bypass", Proceedings of 2010 IEEE International Symposium on Circuits and Systems (ISCAS), Jay 30-Jun. 2, 2010, pp. 3981-3984, IEEE, Paris.

*Primary Examiner* — Yemane Mesfin
*Assistant Examiner* — Abdelillah Elmejjarmi

(57) ABSTRACT

A network having a plurality of switch points, each switch point having both a main multi-stage pipeline and a look-ahead pipeline between input ports and output ports of the plurality of switch points is described. The look-ahead pipeline has fewer pipeline stages than the main multi-stage pipeline. Look-ahead information and corresponding packet are received at an input port. A first stage look-ahead request is generated from the look-ahead information. A second stage look-ahead request is generated in response to the first stage look-ahead request being not granted. And in response to the second stage look-ahead request being granted, transmitting a packet through the switch point using the look-ahead pipeline.

16 Claims, 4 Drawing Sheets

SWITCH POINT HAVING LOOK-AHEAD BYPASS

BACKGROUND

Field

This disclosure relates generally to Networks on Chip methods and systems, and more specifically, to switch points used within NoCs.

Related Art

Networks on Chip (NoC) are challenged with higher performance and communication at increasing bandwidths. In an NoC a packet traverses from a source device to a destination device. The source device and destination device may be directly connected to each other. More likely, the source device and destination devices may be connected through intervening devices. Packets traversing from source devices to destination devices are subject to undesirable latencies. These latencies accumulate as packets traverse each device in the path from source to destination, which limit the performance and adversely affect the overall communication bandwidth of the NoC.

In order to improve performance and bandwidth of the NoC, the latencies associated with traversal of packets from source devices to destination devices need to be addressed.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figures 1, 2:
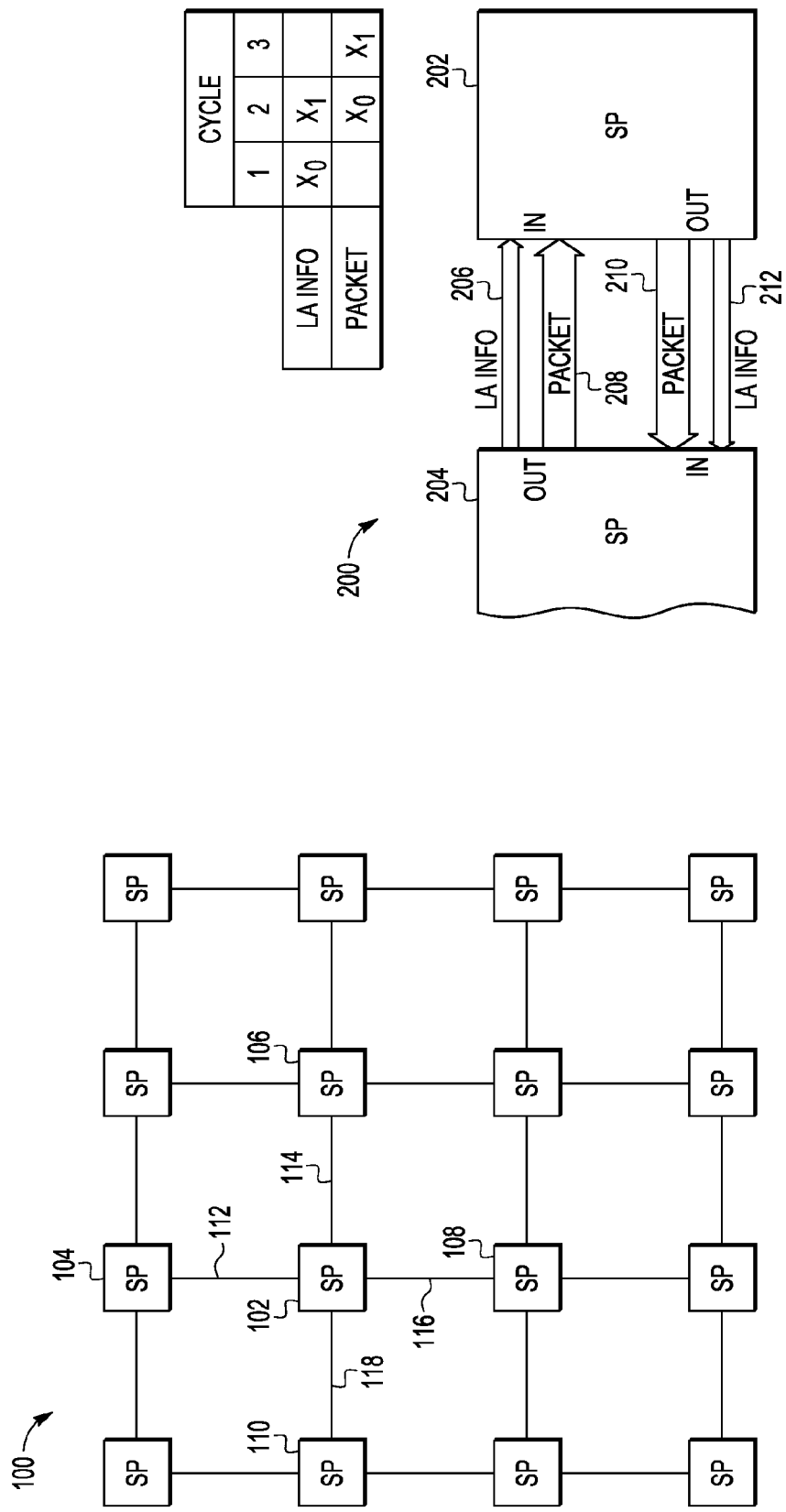
FIG. 1 is an exemplary mesh-interconnected network arrangement in accordance with an embodiment of the present disclosure.
FIG. 2 is an exemplary communication arrangement between two linked switch points in accordance with an embodiment of the present disclosure.

In a network on chip (NoC), network components within the chip can be connected in a mesh arrangement. Nodes of a mesh-interconnected network include switch points (SP). The switch points are the components of the mesh that are responsible for delivering packets from source devices to destination devices. Each packet generally includes control information embedded in a packet header and a payload of data. The control information may include source device address, destination device address, routing information, and the like. Other control information may include protocol information, error detection information, and the like.

The robustness of the SP depends on how fast it can route a packet from an input port to an output port. It is critical that the time it takes for a packet to traverse through an SP be kept at a minimum since a packet can traverse multiple SPs to get to its destination in an NoC. A technique called look-ahead bypass (LA) can allow a packet to obtain a special fast path through the switch in one clock cycle. If a packet fails the look-ahead path, it must go through a slower path (i.e. a main multi-stage path or non-LA path) in the SP to get from one input port to an output port. The latency through this slower path can take four clock cycles.

The present disclosure describes a method and system of employing a multi-stage look-ahead path that allows a packet to traverse an SP in fewer clock cycles than the main multi-stage path, even if an LA attempt fails.

Generally, there is provided, a network having a plurality of switch points. Each switch point may have a plurality of ports for transmitting packets from a source device to a destination device. Each switch point may have both a main multi-stage pipeline between ports of the plurality of ports and a look-ahead pipeline between the ports of the plurality of ports. Wherein the look-ahead pipeline has fewer pipeline stages than the main multi-stage pipeline, a method comprises: receiving a packet and look-ahead information corresponding to the packet at a port of a switch point; generating a first stage look-ahead request from the look-ahead information; determining that the first stage look-ahead request is not granted; generating a second stage look-ahead request from the first stage look-ahead request in response to the first stage look-ahead request not being granted; determining that the second stage look-ahead request is granted; and in response to the second stage look-ahead request being granted, transmitting the packet through the switch point using the look-ahead pipeline. In response to the second stage look-ahead request not being granted, the method may further comprise: generating a third stage look-ahead request from the second stage look-ahead request; determining that the third stage look-ahead request is granted; and transmitting the packet through the switch point using the look-ahead pipeline. In response to the second stage look-ahead request not being granted, the method may further comprise: generating a third stage look-ahead request from the second stage look-ahead request; determining that the third stage look-ahead request is not granted; and transmitting the packet through the switch point using the main multi-stage pipeline. The steps of transmitting the packet through the main multi-stage pipeline may comprise: storing the packet in a storage element of a virtual channel of the switch point; arbitrating for access to the virtual channel; allocating a switch traversal path through the switch point; and transmitting the packet through the allocated switch traversal path. The step of transmitting the packet through the main multi-stage pipeline may further comprise transmitting the packet through the main multi-stage pipeline in four clock cycles, and transmitting the packet through the look-ahead pipeline comprises transmitting the packet through the look-ahead pipeline in less than four clock cycles. The method may comprise the plurality of switch points connected together in a mesh configuration. The method may comprise the packet begin transiting the main multi-stage pipeline concurrently with generating the first stage look-ahead request. The method may comprise in response to one of the first stage look-ahead request and second stage look-ahead request being granted, the transiting of the main multi-stage pipeline may be cancelled.

In another embodiment, there is provided, a method comprising: receiving a packet and look-ahead information corresponding to the packet at a port of a switch point, the switch point being one of a plurality of switch points configured as network; the packet being routed through the switch point between a source and a destination; generating a first stage look-ahead request from the look-ahead information; determining that the first stage look-ahead request is not granted; generating a second stage look-ahead request from the first stage look-ahead request in response to the first stage look-ahead request not being granted; determining that the second stage look-ahead request is granted; and transmitting the packet through the switch point using a look-ahead pipeline in response to the second stage look-ahead request being granted, the look-ahead pipeline having fewer pipelining stages than a main multi-stage pipeline of the switch point. In response to the second stage look-ahead request not being granted, the method further comprises: generating a third stage look-ahead request from the second stage look-ahead request; in response to determining that the third stage look-ahead request may be granted, transmitting the packet through the switch point using the look-ahead pipeline; and in response to determining that the third stage look-ahead request may not be granted, transmitting the packet through the switch point using the main multi-stage pipeline. The steps of transmitting the packet through the main multi-stage pipeline may comprise: storing the packet in a storage element of the switch point; arbitrating a portion of a path between the source and the destination; allocating a switch traversal path through the switch point; and transmitting the packet through the allocated switch traversal path. The method may comprise the plurality of switch points being connected together to form a network in a mesh configuration. The method may comprise the packet begin transiting the main multi-stage pipeline concurrently with generating the first stage look-ahead request. In response to the first stage look-ahead request being granted, the transiting of the main multi-stage pipeline may be cancelled. The method may comprise the switch point being implemented on a single integrated circuit die.

In yet another embodiment, there is provided, a switch point having a plurality of ports. The switch point comprises: a main multi-stage pipeline coupled to the plurality of ports, the multi-stage pipeline having a plurality of pipelining stages for transmitting a packet of information between a selected input port and a selected output port of the plurality of ports; and a look-ahead pipeline coupled to the plurality of ports. The look-ahead pipeline may have fewer pipelining stages than the main multi-stage pipeline. The look-ahead pipeline may be for transmitting the packet of information between the input port and the selected output port. The look-ahead pipeline may have a first look-ahead stage and a second look-ahead stage. The first look-ahead stage may be for providing a first look-ahead request. The packet of information being transmitted through the look-ahead pipeline may be in response to the first look-ahead request being granted. The second look-ahead stage may be for providing a second look-ahead request. The second look-ahead request may be for requesting use of the look-ahead pipeline for the packet of information in response to the first look-ahead request not being granted. The look-ahead pipeline may further comprise a third look-ahead stage. The third look-ahead stage may be for providing a third look-ahead request. The third look-ahead request may be provided in response to the first and second look-ahead requests not being granted. The packet of information may be transmitted through the look-ahead pipeline in response to the third look-ahead request being granted, and the packet of information may be transmitted through the main multi-stage pipeline in response to the third look-ahead request not being granted. The main multi-stage pipeline may further comprise: a plurality of storage elements; an arbitrator coupled to the plurality of storage elements; a plurality of switches for interconnecting the plurality of ports, access to the plurality of switches by the packet being arbitrated for using the arbitrator; and allocation logic coupled to the plurality of switches, the allocation logic for allocating use of the plurality of switches for the packet. The look-ahead pipeline further comprises the first and second look-ahead stages being coupled in series to the plurality of switches. The allocation logic may further comprise: fast allocation and arbitrator logic for allocating use of the plurality of switches when the packet may be transmitted using the look-ahead pipeline; and slow allocation and arbitrator logic for allocating use of the plurality of switches when the packet may be transmitted using the main multi-stage pipeline.

FIG. 1 illustrates an exemplary mesh-interconnected network 100 arranged in accordance with an embodiment of the present disclosure. The mesh-interconnected network 100 includes a plurality of switch point (SP) components coupled via links. Each link may comprise buses, control signals, and the like. In this embodiment, the mesh-interconnected network 100 is arranged in a four rows by four columns configuration (4×4 mesh). In alternate embodiments, the mesh-interconnected network may include fewer or greater than four components in rows and fewer or greater than four components in columns. Each node of the mesh-interconnected network includes a switch point component. Each switch point includes one or more ports for communicating with other switch points and endpoint (EP) devices. Such endpoint devices may include source devices, destination devices, and the like. In some embodiments, switch points may include one or more ports that are not used or disconnected from the mesh. In the exemplary mesh-interconnected network 100, a first (North) port of SP 102 is coupled to SP 104 via link 112, a second (East) port of SP 102 is coupled to SP 106 via link 114, a third (South) port of SP 102 is coupled to SP 108 via link 116, and a fourth (West) port of SP 102 is couple to SP 110 via link 118. A fifth (Local) port of SP 102 (not shown) is coupled to a local processing feature of the SP 102.

FIG. 2 illustrates an exemplary communication arrangement 200 between two linked switch points in accordance with an embodiment of the present disclosure. In this embodiment, SP 202 and SP 204 are coupled via a link comprised of buses and control signals. SP 204 provides, at an output port, look-ahead (LA) bypass control information on bus 206 and a corresponding packet on packet bus 208. The LA information and corresponding packet from the output port of SP 204 are received at an input port of SP 202. Similarly, SP 202 provides, at an output port, LA information on bus 212 and corresponding packet on packet bus 210. The LA information and corresponding packet from the output port of SP 202 are received at an input port of SP 204. Generally, the LA information will lead the corresponding packet by one cycle. In one embodiment, the LA control information may lead the packet by more than one cycle. In one embodiment, the LA control information may be provided in the same cycle as the corresponding packet.

Figure 3:
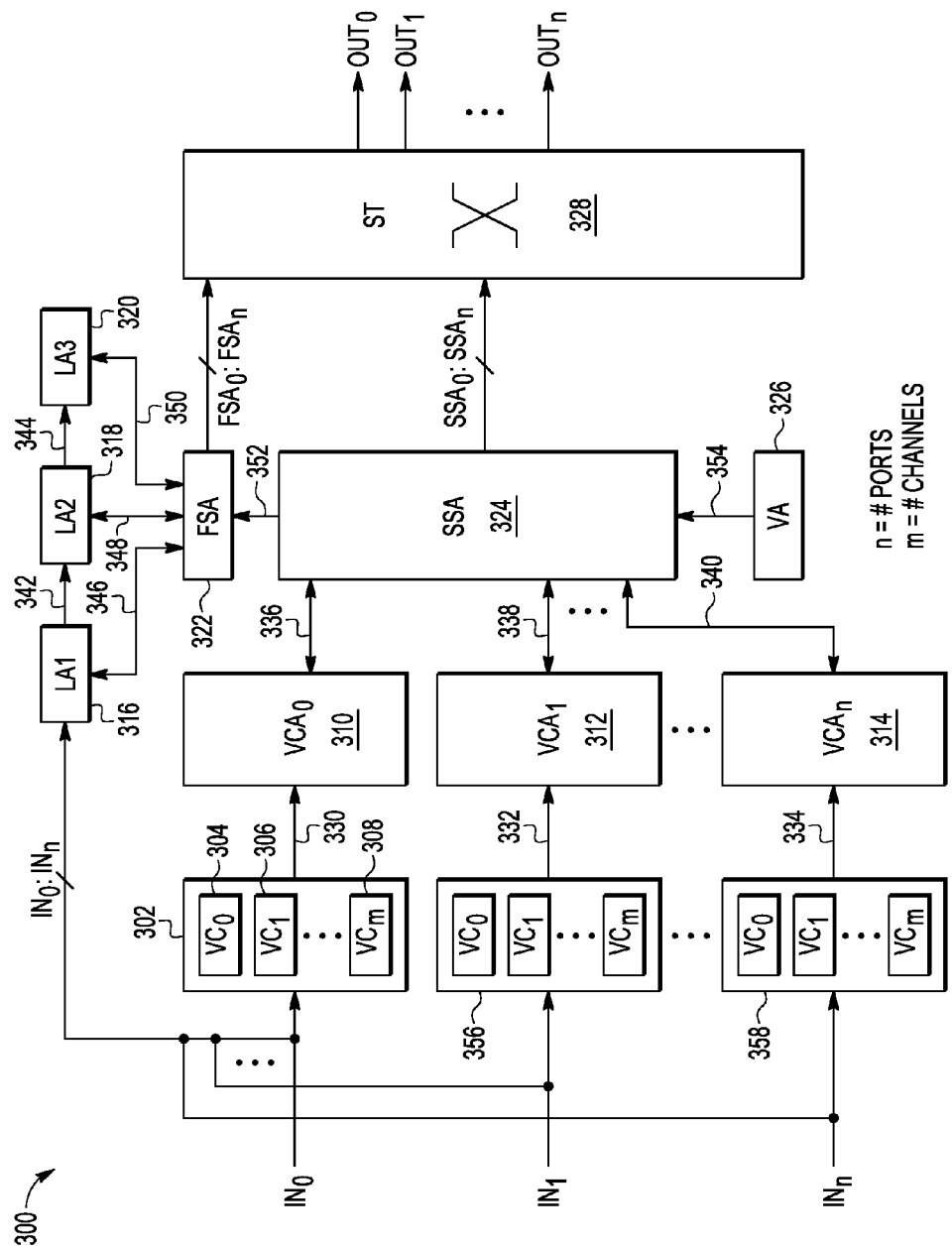
FIG. 3 is a block diagram of a multiple port switch point in accordance with an embodiment of the present disclosure.

FIG. 3 illustrates a block diagram of a multiple port switch point 300 in accordance with an embodiment of the present disclosure. The switch point 300 includes two concurrent pipeline paths, a main multi-stage pipeline path and a look-ahead pipeline path, in which packets can traverse the SP 300 from a plurality of input ports to a plurality of output ports. In this embodiment, both the main multi-stage pipeline and the look-ahead pipeline are coupled between input ports IN0-INn and output ports OUT0-OUTn of the SP 300.

The look-ahead pipeline has fewer stages than the main multi-stage pipeline and therefore, can transmit a packet of information from an input port and to an output port of the SP 300 in fewer clock cycles. In this embodiment, the look-ahead pipeline comprises three stages—a first look-ahead stage LA1 316, a second look-ahead stage LA2 318, and a third look-ahead stage LA3 320. In one embodiment, the look-ahead pipeline may comprise two look-ahead stages. In alternate embodiments, the look-ahead pipeline may comprise more than three look-ahead pipeline stages. A fast switch arbitration FSA unit 322 is coupled to each of the look-ahead stages (316, 318, and 320) and receives requests from each of the look-ahead stages and provides responses. When a packet is received at IN0, the first look-ahead stage LA1 316 provides a first look-ahead request 346 to the FSA unit 322 and in response to the first look-ahead request 346 being granted, the packet is transmitted through the look-ahead pipeline. If the first look-ahead request 346 is not granted, the second look-ahead stage LA2 318, coupled in series with the first look-ahead stage LA1 316, provides a second look-ahead request 348 to the FSA unit 322 to request use of the look-ahead pipeline for the packet. If the first look-ahead request 346 and second look-ahead request 348 are not granted, the third look-ahead stage LA3 320, coupled in series with the second look-ahead stage LA2 318 provides a third look-ahead request 350 to the FSA unit 322 to request use of the look-ahead pipeline for the packet. If the third look-ahead request 350 is granted, the packet is transmitted through the look-ahead pipeline. If the third look-ahead request 350 is not granted, the packet is transmitted through the main multi-stage pipeline.

The main multi-stage pipeline comprises four stages, a virtual channel storage stage, a virtual channel arbitration stage, a slow switch allocation stage, and a switch transversal stage. In an embodiment, one clock cycle is used to traverse each of the four stages. In the main multi-stage pipeline of SP 300, a plurality of VC storage blocks are coupled the plurality of input ports. In this embodiment, VC storage blocks 302, 356, and 358 are coupled to input ports IN0, IN1, and INn respectively. The VC storage blocks may include one or more storage elements. In some embodiments, storage elements may comprise buffers, FIFOs, registers, memories, or the like. In this embodiment, the VC storage blocks have a storage capacity for m−1 virtual channels, VC0-VCm. A first VC storage block 302 is coupled to input port 0 (IN0) and includes storage elements for each of m−1 virtual channels. For example, when a packet is received at IN0, the packet can be stored in an empty one of the VC storage elements VC0-VCm (304, 306, and 308). An output of each of the virtual channel buffer blocks (302, 356, and 358) is coupled to a respective virtual channel arbitration (VCA) unit (310, 312, and 314). For example, an output of the first VC buffer block 302 is coupled to a first VCA unit (VCA0) 310 via bus 330. The VCA0 310 selects a virtual channel arbitration winner, one of the VC0-VCm, to transfer the packet to the next stage of the main multi-stage pipeline. A slow switch allocation (SSA) unit 324 is coupled between the VCA units and a crossbar switch traversal (ST) unit 328. The ST unit 328 comprises a plurality of switches for coupling the plurality of output ports with arbitration winners allocated at the SSA unit 324. The SSA unit 324 receives requests from the arbitration winner of each VCA unit and determines a single winner based on a round robin arbitration scheme. In alternate embodiments, other arbitration schemes may be used to determine the single winner. The SSA unit 324 is coupled to a virtual channel allocation (VA) unit 326 via bus 354. Once the SSA unit 324 allocates a port and the VA unit 326 allocates a VC, then the packet is transmitted through the crossbar ST unit 328 to one of the output ports OUT0-OUTn.

Figure 4:
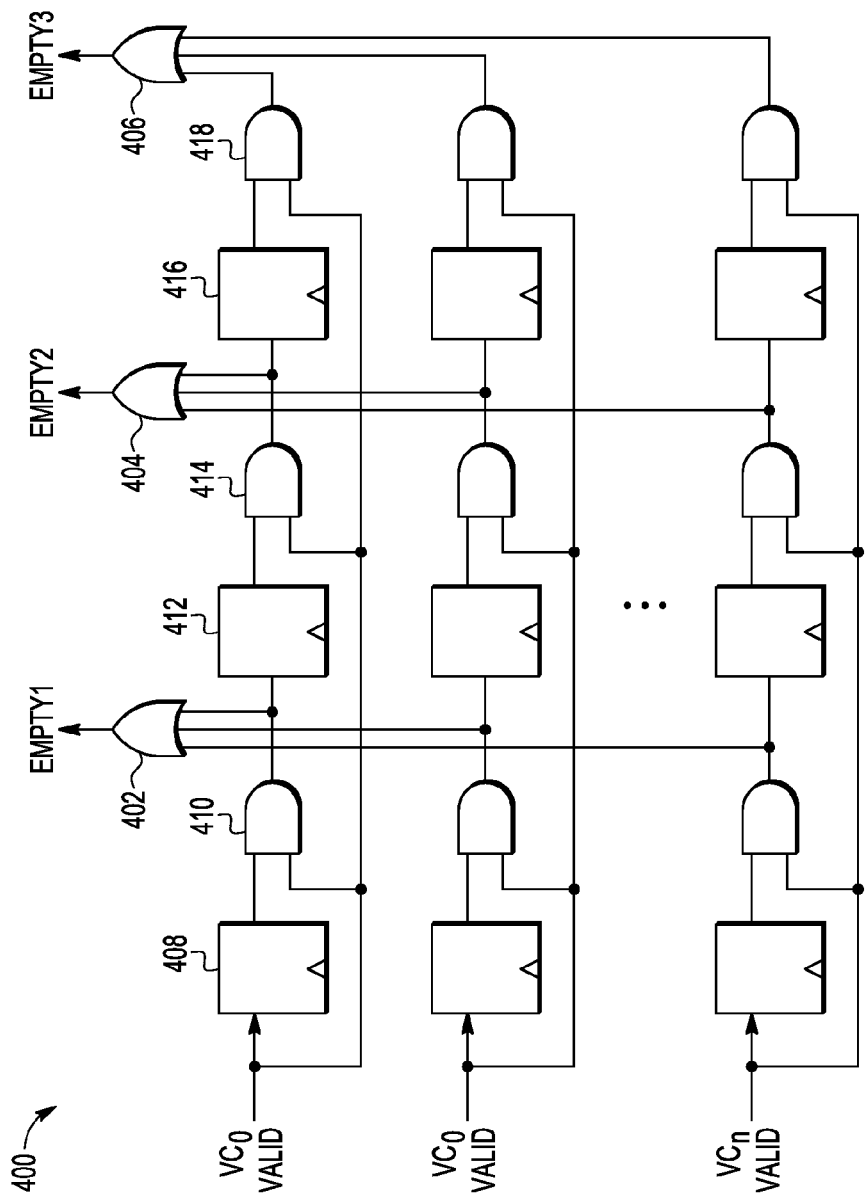
FIG. 4 is a logic diagram of an exemplary empty conditions logic in accordance with an embodiment of the present disclosure.

FIG. 4 illustrates a logic diagram of an exemplary empty conditions logic 400 in accordance with an embodiment of the present disclosure. In this embodiment, when a virtual channel is stored in a virtual channel storage element, a virtual channel valid value is produced. The empty conditions logic 400 registers the valid values of all of the virtual channels of a VC storage block and determines which empty conditions signal(s) to assert. A de-assertion of empty1 signal at the output of OR gate 402 allows for the possibility of an LA1 request to be asserted. A de-assertion of empty2 signal at the output of OR gate 404 allows for the possibility of an LA2 request to be asserted. A de-assertion of empty3 signal at the output of OR gate 406 allows for the possibility of the LA3 request to be asserted.

Figure 5:
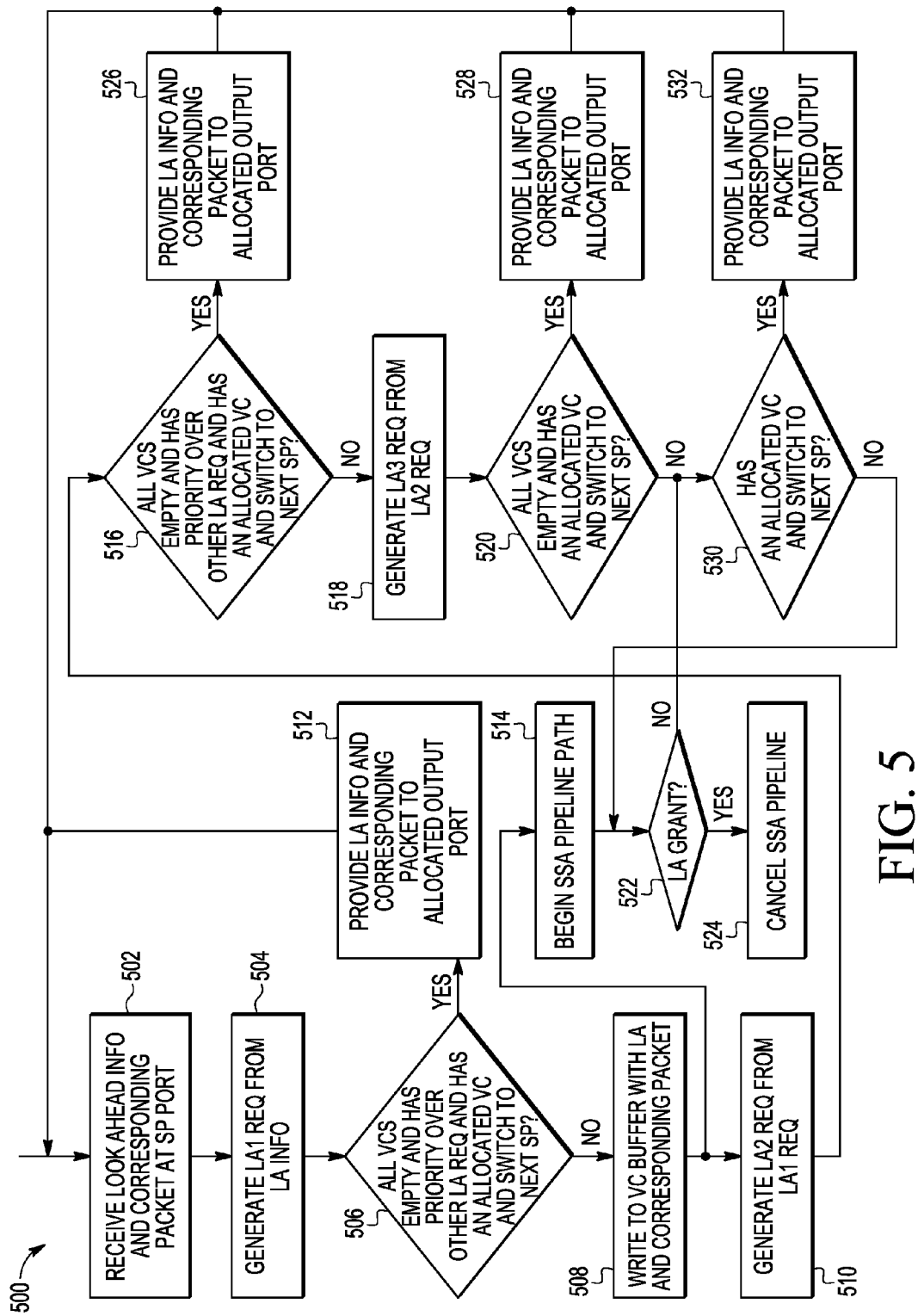
FIG. 5 is a flow diagram for transmitting packets from a source device to a destination device in a network having a plurality of switch points in accordance with an embodiment of the present disclosure.

FIG. 5 is a flow diagram 500 for transmitting packets from a source device to a destination device in a network having a plurality of switch points in accordance with an embodiment of the present disclosure. In this embodiment, each SP has both a main multi-stage pipeline between a plurality of input ports and a plurality of output ports and a look-ahead pipeline between the plurality of input ports and the plurality of output ports. The look-ahead pipeline has fewer stages than the main multi-stage pipeline and therefore, a packet can traverse the SP in fewer clock cycles when using the look-ahead pipeline.

At step 502, look-ahead information and corresponding packet is received at an input port of an SP. The look-ahead information is sent prior to the corresponding packet and sent on a separate path from the corresponding packet data. In an embodiment, the look-ahead information is sent one or more clock cycles ahead of the corresponding packet. In an embodiment, the look-ahead information and the corresponding packet may be sent within the same clock cycle. The look-ahead information may include control and routing information for a next router such that computation on incoming packets is not needed to determine where to route the packets. Look-ahead information may also include a virtual channel identifier (VCID) to allow the next router to determine which VC storage to use for storing an incoming packet.

At step 504, a first stage look-ahead (LA1) bypass request is generated from the look-ahead information.

At step 506, determine whether to grant the LA1 request. The LA1 request is granted if all virtual channels are empty (no transactions pending) and that the LA1 request has priority over other LA requests and that the LA1 request has an allocated VC and switch winner of a SP output port from an arbitration process. If the LA1 request is granted (yes), at step 512, provide LA information and corresponding packet to allocated output port and return at step 502. If the LA1 request is not granted (no), then at step 508, the LA information and the corresponding packet are written into a VC storage element.

At step 510, in response to the LA1 request not being granted, a second look ahead request (LA2) is generated from the LA1 request.

At step 514, concurrently in response to the LA1 request not being granted, packet traversal through the main multi-stage pipeline is started.

At step 516, determine whether to grant the LA2 request. The LA2 request is granted if all virtual channels are empty and the LA2 request has priority over other LA requests and the LA2 request has an allocated VC and switch winner of the SP output port to next SP. If the LA2 request is granted (yes), at step 526, provide LA information and corresponding packet to the allocated output port transmitting the packet through the SP using the look-ahead pipeline, and return at step 502. If the LA2 request is not granted (no), then at step 518, a third look ahead request (LA3) is generated from the LA2 request.

At step 520, determine whether to grant the LA3 request. The LA3 request is granted if all virtual channels are empty and the LA3 request has an allocated VC and switch winner of the SP output port to next SP. If the LA3 request is granted (yes), at step 528, provide LA information and corresponding packet to the allocated output port transmitting the packet through the SP using the look-ahead pipeline, and return at step 502. If the LA3 request is not granted (no), continue at step 530.

At step 530, since the LA3 request was not granted, determine whether LA3 request has an allocated VC and switch to the next SP. If the LA3 request has an allocated VC and switch to the next SP (yes), then at step 532, provide LA information and corresponding packet to the allocated output port transmitting the packet through the SP using the look-ahead pipeline, and return at step 502. If the LA3 request does not have an allocated VC and switch to the next SP (no), then continue at step 522.

At step 522, determine whether the packet traversal through the look-ahead pipeline succeeded. If the packet traversal through the look-ahead pipeline succeeded (yes), then at step 524, the packet traversal through the main multi-stage pipeline is cancelled. If the packet traversal through the look-ahead pipeline did not succeed (no), then continue the packet traversal through the main multi-stage pipeline, and continue at step 530.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although aspects of the invention have been described with respect to exemplary digital logic, skilled artisans appreciate that other logic or circuitry may be implemented to perform intended function or operation.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the embodiment of the mesh-interconnected network 100 is described with reference to a 4×4 mesh arrangement. In alternate embodiments, the mesh-interconnected network may comprise a 1×2 mesh arrangement. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a network having a plurality of switch points, each switch point having a plurality of ports for transmitting packets from a source device to a destination device, and each switch point having both a main multi-stage pipeline between ports of the plurality of ports and a look-ahead pipeline between the ports of the plurality of ports, wherein the look-ahead pipeline has fewer pipeline stages than the main multi-stage pipeline, a method comprising:
   receiving a packet and look-ahead information corresponding to the packet at a port of a switch point;
   generating a first stage look-ahead request from the look-ahead information;
   determining that the first stage look-ahead request is not granted;
   generating a second stage look-ahead request from the first stage look-ahead request in response to the first stage look-ahead request not being granted;
   determining that the second stage look-ahead request is granted;
   in response to the second stage look-ahead request being granted, transmitting the packet through the switch point using the look-ahead pipeline; and in response to the second stage look-ahead request not being granted:
      generating a third stage look-ahead request from the second stage look-ahead request;
      determining that the third stage look-ahead request is not granted; and
      transmitting the packet through the switch point using the main multi-stage pipeline.

2. The method of claim 1, wherein transmitting the packet through the main multi-stage pipeline comprises:
   storing the packet in a storage element of a virtual channel of the switch point;
   arbitrating for access to the virtual channel;
   allocating a switch traversal path through the switch point; and
   transmitting the packet through the allocated switch traversal path.

3. The method of claim 1, wherein transmitting the packet through the main multi-stage pipeline further comprises transmitting the packet through the main multi-stage pipeline in four clock cycles, and transmitting the packet through the look-ahead pipeline comprises transmitting the packet through the look-ahead pipeline in less than four clock cycles.

4. The method of claim 1, wherein the plurality of switch points are connected together in a mesh configuration.

5. The method of claim 1, wherein the packet begins transiting the main multi-stage pipeline concurrently with generating the first stage look-ahead request.

6. The method of claim 1, wherein in response to one of the first stage look-ahead request and second stage look-ahead request being granted, the transiting of the main multi-stage pipeline is cancelled.

7. A method comprising: receiving a packet and look-ahead information corresponding to the packet at a port of a switch point, the switch point being one of a plurality of switch points configured as network; the packet being routed through the switch point between a source and a destination;
   generating a first stage look-ahead request from the look-ahead information;
   determining that the first stage look-ahead request is not granted;
   generating a second stage look-ahead request from the first stage look-ahead request in response to the first stage look-ahead request not being granted;
   determining that the second stage look-ahead request is granted; and
   transmitting the packet through the switch point using a look-ahead pipeline in response to the second stage look-ahead request being granted, the look-ahead pipeline having fewer pipelining stages than a main multi-stage pipeline of the switch point;
   generating a third stage look-ahead request from the second stage look-ahead request;
   in response to determining that the third stage look-ahead request is granted, transmitting the packet through the switch point using the look-ahead pipeline; and
   in response to determining that the third stage look-ahead request is not granted, transmitting the packet through the switch point using the main multi-stage pipeline.

8. The method of claim 7, wherein transmitting the packet through the main multi-stage pipeline comprises:
   storing the packet in a storage element of the switch point;
   arbitrating a portion of a path between the source and the destination;
   allocating a switch traversal path through the switch point; and
   transmitting the packet through the allocated switch traversal path.

9. The method of claim 7, wherein the plurality of switch points are connected together to form a network in a mesh configuration.

10. The method of claim 7, wherein the packet begins transiting the main multi-stage pipeline concurrently with generating the first stage look-ahead request.

11. The method of claim 7, wherein in response to the first stage look-ahead request being granted, the transiting of the main multi-stage pipeline is cancelled.

12. The method of claim 7, wherein the switch point is implemented on a single integrated circuit die.

13. A switch point having a plurality of ports, the switch point comprising:

a main multi-stage pipeline coupled to the plurality of ports, the multi-stage pipeline having a plurality of pipelining stages for transmitting a packet of information between a selected input port and a selected output port of the plurality of ports; and a look-ahead pipeline coupled to the plurality of ports, the look-ahead pipeline having fewer pipelining stages than the main multi-stage pipeline, the look-ahead pipeline for transmitting the packet of information between the input port and the selected output port, wherein the look-ahead pipeline having a first look-ahead stage, a second look-ahead stage, and a third look-ahead stage, the first look-ahead stage for providing a first look-ahead request, the packet of information being transmitted through the look-ahead pipeline in response to the first look-ahead request being granted, the second look-ahead stage for providing a second look-ahead request, the second look-ahead request for requesting use of the look-ahead pipeline for the packet of information in response to the first look-ahead request not being granted, and the third look-ahead stage for providing a third look-ahead request, the third look-ahead request being provided in response to the first and second look-ahead requests not being granted, wherein the packet of information being transmitted through the look-ahead pipeline in response to the third look-ahead request being granted, and wherein the packet of information being transmitted through the main multi-stage pipeline in response to the third look-ahead request not being granted.

14. The switch point of claim 13, wherein the main multi-stage pipeline further comprises:

a plurality of storage elements;

arbitrator coupled to the plurality of storage elements;

a plurality of switches for interconnecting the plurality of ports, access to the plurality of switches by the packet being arbitrated for using the arbitrator; and allocation logic coupled to the plurality of switches, the allocation logic for allocating use of the plurality of switches for the packet.

15. The switch point of claim 13, wherein the look-ahead pipeline further comprises the first and second look-ahead stages being coupled in series to the plurality of switches.

16. The switch point of claim 14, wherein the allocation logic further comprises:

fast allocation and arbitrator logic for allocating use of the plurality of switches when the packet is being transmitted using the look-ahead pipeline; and slow allocation and arbitrator logic for allocating use of the plurality of switches when the packet is being transmitted using the main multi-stage pipeline.

\* \* \* \* \*